United States Patent
Miller et al.

(10) Patent No.: US 8,261,623 B2
(45) Date of Patent: Sep. 11, 2012

(54) COMMUNICATION SYSTEM FOR PIPELINE INSPECTION

(75) Inventors: Jerry E. Miller, Traverse City, MI (US); Randall L. Perrin, Grawn, MI (US); James D. Anderson, Kingsley, MI (US); Jabin D. Reinhold, Traverse City, MI (US); Douglas W. Spencer, Williamsburg, MI (US)

(73) Assignee: Microline Technology Corporation, Traverse City, MI (US)

( * ) Notice: Subject to any disclaimer, the term of this patent is extended or adjusted under 35 U.S.C. 154(b) by 779 days.

(21) Appl. No.: 12/169,269

(22) Filed: Jul. 8, 2008

(65) Prior Publication Data

US 2009/0013806 A1   Jan. 15, 2009

Related U.S. Application Data

(60) Provisional application No. 60/948,601, filed on Jul. 9, 2007.

(51) Int. Cl.
   *G01M 99/00*   (2006.01)
(52) U.S. Cl. .................................................. 73/865.8
(58) Field of Classification Search ....... 73/865.8–865.9
   See application file for complete search history.

(56) References Cited

U.S. PATENT DOCUMENTS

| | | |
|---|---|---|
| 3,754,275 A | 8/1973 | Carter et al. |
| 5,417,112 A | 5/1995 | Rosenberg |
| 5,549,000 A | 8/1996 | Brown et al. |
| 5,748,147 A | 5/1998 | Bickley et al. |
| 6,243,657 B1 | 6/2001 | Tuck et al. |
| 6,553,322 B1 | 4/2003 | Ignagni |
| 6,816,110 B1 | 11/2004 | Liu et al. |
| 6,965,320 B1 | 11/2005 | Casey et al. |
| 7,222,549 B2 | 5/2007 | Abney |
| 2004/0261547 A1* | 12/2004 | Russell et al. ............... 73/865.8 |

(Continued)

FOREIGN PATENT DOCUMENTS

| | | | | |
|---|---|---|---|---|
| JP | 2001235089 A | * | 8/2001 | |
| KR | 2005048752 A | * | 5/2005 | |

OTHER PUBLICATIONS

Casey, Earnest D., "Pipeline & Storage Facilities Using Low Earth Orbit Satellite Systems to Relay Operations Data," Pipeline & Gas Journal, Aug. 2002, 2 pages.

(Continued)

*Primary Examiner* — Hezron E Williams
*Assistant Examiner* — Nashmiya Fayyaz
(74) *Attorney, Agent, or Firm* — Gardner, Linn, Burkhart & Flory, LLP

(57) ABSTRACT

An inline tool tracking system for tracking an inline tool traveling along a pipe includes a detection and communication device operable to detect an inline tool as it passes generally near the device. The detection and communication device is operable to generate a detection output, which includes data indicative of the detection of the tool and a geographical location of the device. A control is operable to wirelessly receive the detection output and to process the detection output. The control generates a control output responsive to the processing, and the control output is indicative of the detection of the tool and the geographical location of the detection and communication device. A display device receives an input indicative of the control output and displays the information indicative of the detection of the tool and the geographical location of the detection and communication device to a user of the display device.

44 Claims, 7 Drawing Sheets

U.S. PATENT DOCUMENTS

2007/0286682 A1* 12/2007 Freyer et al. ............... 405/184.1

OTHER PUBLICATIONS

"StarTrak in a Nut Shell," StarTrak Pigging Technologies, Inc., 6 pages.

Casey, Earnest D., "Monitoring Pipeline Travelers Including Inspection Tools Using ESRI Geographical Technology," Paper UC1661, 9 pages.

Printout of portion of starpig.com website, titled Satellite Monitoring Systems, printed Jan. 23, 2007, 2 pages.

* cited by examiner

COMMUNICATION SYSTEM FOR PIPELINE INSPECTION

CROSS REFERENCE TO RELATED APPLICATION

The present application claims the benefit of U.S. provisional application Ser. No. 60/948,601, filed Jul. 9, 2007, which is hereby incorporated herein by reference in its entirety.

BACKGROUND OF THE INVENTION

Inline pipeline inspection involves sending an inspection tool through a pipe, typically while the pipe is carrying product. The inspection tools are commonly referred to as "pigs" and the process of sending a pig through a pipe is known in the industry as "pigging". The pigs often travel through the pipeline for long distances, perhaps several hundred miles, and are propelled by the movement of the product (either liquid or gas) in the pipeline. Typically, to provide the motive force to move the pig, polyurethane sealing cups, or disks, are integrated into the pig's construction. The cups may completely seal or semi-seal at or against the inner wall of the pipe, creating a pressure differential that powers or propels the pig through the pipe.

As a matter of safety and logistics, pipeline operators must exercise great care with respect to the location, status or movement of a pig while the pig is in the pipeline. A lost pig could damage the system or cause an expensive shutdown. To prevent these problems, operators carefully guide the pig by opening and closing valves to direct the pig past pumping stations and "un-piggable" segments of the pipeline. In order to guide the pig, the pipeline operators must know the location of the pig and know when it has passed specific landmarks or above ground references (AGRs). During a pigging operation, tracking teams must monitor specific points along the pipeline to determine when the pig passes the landmark. This often requires coordination between multiple teams located miles apart. Often, operations are conducted in remote areas that lack communications infrastructure such as cellular telephone towers.

Many instruments are currently in use to detect the passage of inspection pigs as they travel through pipelines. Typically, pigs exhibit a variety of characteristics during use that make them possible to detect as they pass underground through a pipeline. For example, many pigs use magnets as a part of the inspection process. The magnets generate a magnetic field that is detectable above ground. Also, virtually all pigs create noise and vibrations as they move through the pipe. Sensitive geophones or accelerometers or seismographs (such as those used to detect earthquakes) can pick up these noises and allow tracking technicians to listen for the pig's approach and subsequent passage. Further, many pigs carry an onboard transmitter that emits a low frequency electromagnetic field (typically in the 15 to 22 Hz range). Electromagnetic fields in these frequencies can pass through metal pipes and earth and can be detected above the surface with the proper equipment.

However, each of these detection methods has shortcomings and no method is always reliable. Further, none of these detection methods is suitable for all pigs because different pigs have different characteristics. For example, a foam pig is not detectable with magnetic sensing and a pig without a low frequency transmitter obviously needs to be detected by something other than a low frequency receiver. Different soil conditions may also hinder or interfere with one or more detections methods. Electrical transmission lines can also severely hinder low frequency detection and highway noises can obscure noises normally detected with a geophone.

To overcome some of these barriers, pigging crews use multiple devices with different detection methods in order to improve the likelihood of detecting the pig as it passes the AGM. However, using multiple devices increases the complexity and cost to the system and also increases the workload for the pigging crew. In some cases, pigging crews have relied on a single AGM and mistakenly deployed the wrong type of AGM and failed to detect the pig as it went by.

A common application of pigs in the pipeline industry is the use of magnetic flux leakage (MFL) tools for the detection of thin or weakened areas or other anomalies in the wall of the pipe. Precisely locating an anomaly requires an above-ground marker at a known position to corroborate the positional information gathered by the inspection tool. As a pig logs the inspection data, the pig's processor records the time and the cumulative distance as measured by the pig's odometer. However, odometers sometimes slip, or accumulate pipeline deposits on the odometer wheel, thus changing the diameter of the odometer wheel and thus leading to inaccurate measurements. These problems can be the source of significant cumulative error over long distances. The above-ground marker detects the pig as it passes known reference points and provides benchmarks that can be used to correct for cumulative odometer errors. After the pig is retrieved from the pipeline, the time of the pig's passage past known benchmarks (as a result of the tracking crew detecting the pig at a known time and a known place) is compared with the corresponding timestamps made from the pig's internal time clock as the pig passed the reference point. By comparing the two times, technicians are able to post-process the data to correct for any errors in the pig's odometer. Post-processing requires a technician, or log analyst, to use the time stamps, AGM position, and pipeline drawings to match logged pipe features to the corresponding features on the pipeline. Typically, with the information available, an analyst is able to correctly match the inspection log with the drawings on a joint-to-joint basis. Keeping each of the clocks in the system synchronized as closely as possible is essential for accurately determining the pig's position at each reference point.

Thus, a need also exists for system-wide clock synchronization. A need also exists for a simplified system that is capable of detecting pigs using a variety of detection methods to cover the widest possible range of pigs and operating conditions. A need also exists for devices with improved detection capability. Therefore, there is a need in the art for a pig tracking system that overcomes the shortcomings of the prior art.

SUMMARY OF THE INVENTION

The present invention provides a tracking and monitoring system for tracking and/or monitoring a pipeline inspection tool or pig as it moves through a pipe or conduit of a pipeline or the like. The monitoring system consists of the following components: (i) a tracking team or teams (including field team members and team members monitoring the pigging operation via the internet such as a central monitoring station personnel, pipeline operators, pump operators, supervisors or managers); (ii) a pig detection device capable of detecting the pig as it passes through the pipeline; (iii) a means to monitor the pig detection device, (iv) a communications network to allow the tracking team, or teams, and the pipeline operator to monitor the pig's progress as well as team locations, regardless of geographic position; (v) a system for correlating and adjusting or scaling the logged data to match the actual distance inspected by the pig; and (vi) a method for synchronizing the clocks in the system to improve the baselining process.

The tracking system of the present invention uses multiple detection methods to detect the approach and passage of the inline inspection (ILI) tool or tools (commonly referred to as "pigs") as the tool progresses along and through the pipeline. The tracking system reports tool passage to both the tracking crew at the inspection point or data collection point or location or hub or above ground marker (AGM) and a central monitoring system, such as a remote server or control. The server, in turn, communicates the data to other tracking teams in the field to enable the entire team to monitor the progress of the tool and to see the locations of other team members while tracking the tool. Data collected at the passage event or AGM is stored at the AGM and at the Internet server to be used as a reference for correcting the time and position information gathered by the inspection tool. The communications hub enables the tracking crew to (i) monitor the status of the AGM and its sensory data; (ii) communicate with other tracking crews regardless of geographic separation; and/or (iii) monitor the location of an inspection tool as it passes other AGMs.

According to an aspect of the present invention, an inline tool tracking system for tracking an inline tool traveling along and through a pipe or conduit includes a detection and communication device operable to detect an inline tool as the tool passes generally at or near the detection and communication device. The detection and communication device is operable to generate a detection output, which includes data indicative of the detection of the tool and a geographical location of the detection and communication device. The system includes a control that is remote from the detection and communication device, and that is operable to wirelessly receive the detection output of the detection and communication device and to process the detection output. The control generates a control output responsive to the processing, with the control output being indicative of the detection of the tool and the geographical location of the detection and communication device. The system includes a display device that receives an input indicative of the control output and that displays the information indicative of the detection of the tool and the geographical location of the detection and communication device to a user of the display device.

In one form, the control is associated with at least one tracking communication device at or near at least one tracking vehicle, and the control is operable to wirelessly receive the detection output from the detection and communication device and to wirelessly communicate the control output to the display device. Optionally, the control may be incorporated into the display device, whereby the display device may receive the detection output from the detection and communication device.

In another form, the control may be remote from the tracking communication device and the detection and communication device (for example, the control may comprise a central control or server), whereby the tracking communication device may receive the control output from the control and may communicate an output to the display device, which may be associated with at least one tracking vehicle. Optionally, the detection and communication device may generate the detection output to a satellite, and the control may receive the detection output of the detection and communication device via the satellite. The tracking communication device may be operable to receive the control output from the control.

The detection and communication device may detect the inline tool via at least one of an acoustic detection device, a magnetic detection device and an electromagnetic frequency detection device, such as a low frequency detection device. Optionally, and desirably, the detection and communication device may detect the inline tool via an acoustic detection device, a magnetic detection device and an electromagnetic detection device. The control may receive geographical location data of the tracking communication devices from the tracking communication devices, whereby the control output may include the geographical location of the tracking communication devices, so that the team members in the field may readily determine or be alerted to which tracking vehicle is closest to the detected pig.

The detection and communication device (AGM) may be operable to generate a short range communication signal to one or more nearby tracking communication devices (communications hubs). The short range communication signal may include data indicative of the detection of the inspection tool and a geographical location of the detection and communication device. Optionally, the detection output and the control output may include audio data indicative of recorded audio signals during passage of the inspection tool. The system may further comprise an audio output device associated with each of the one or more tracking devices, with the tracking device or devices communicating the audio data to the audio output devices of the respective tracking vehicles.

Therefore, the present invention provides a tracking system for tracking an inline inspection tool or pig as the pig travels along and through a pipeline. The tracking system provides enhanced detection capabilities and enhanced communication of the approach and arrival and passage of the tool or pig at particular passage points along the pipeline, such as via satellite communications. The tracking system communicates the pig detection data to tracking vehicles in the field so multiple vehicles or team members are notified of the pig passage to track and monitor the pig as it travels along and through the pipeline. The tracking system may also communicate the pig detection data to a central monitoring station via a satellite network. The enhanced detection capabilities and/or enhanced communication capabilities of the present invention may also allow the tracking system to more accurately and precisely locate a stationary and/or moving pig in the pipeline.

These and other objects, advantages, purposes and features of the present invention will become apparent upon review of the following specification in conjunction with the drawings.

DESCRIPTION OF THE PREFERRED EMBODIMENTS

Figure 1:
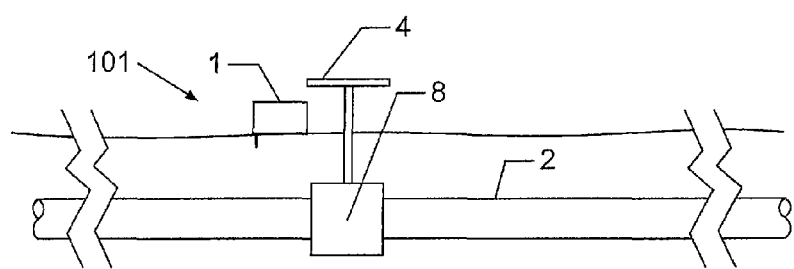
FIG. 1 is schematic of a tracking system of the present invention, showing an above ground marker at or near a reference representative of a feature of a pipeline.

Referring now to the drawings and the illustrative embodiments depicted therein, a pipeline inspection tool tracking system or pig tracking system 100 is operable to track and/or monitor the approach of or location of a pipeline inspection tool or pig 40 as the pig travels along the pipeline. As used herein, the term "pig" is meant to encompass all types of pipeline pigs including inline inspection tools and the like. The system 100 is operable to track the geographic location of the pig 40 and may communicate the pig's location information and/or collected data or information to one or more tracking personnel, as discussed below. The system 100 is designed to detect the passage of the pig 40, notify the interested parties when the pig passes under an above ground reference (AGR) 4, and facilitate the movements of tracking personnel, as also discussed below.

As shown in FIGS. 1-4, system 100 includes an AGM system or detection system 101, which includes the above ground marker (AGM) 1, which is typically located at an AGR 4, which is indicative of or corresponds to a pipe characteristic or underground feature 8 of the pipeline or conduit or pipe 2 located below the surface. The pipeline inspection tool or pig 40 is positioned within the pipeline 2 (such as at a remote location) and travels along the pipeline 2 (such as via its own motive force or via movement of the materials within the pipeline). In a preferred embodiment, as the tool or pig 40 travels along the pipeline 2, the pig inspects the pipe to determine if there are any abnormalities or the like along the pipe that may be indicative of a hole or weakened portion of the pipe that may need repair or replacement. For example, the pig 40 may detect the wall thickness of the pipe and may determine a thin or reduced thickness area of the pipeline 2. The pig 40 may collect data of the pipeline characteristics and location or time information so that the collected data can be correlated to a particular location along the pipeline 2. Optionally, the pig 40 may perform other functions as it travels along the pipeline, such as, but not limited to, gauging, mapping, batching, cleaning, scraping, or measuring pipe geometry, such as inside diameter, bends, dents, restrictions or wrinkles and/or the like.

System Components:

The system 100 includes the following major components: an above ground marker (AGM) 1 (which is used to detect the pig 40 and report when the pig 40 passes an above ground reference (AGR) 4); a communications hub 9 (which monitors the AGM 1, communicates with a hand held computer, PDA, or display device, and communicates with or sends information to and receives information from a satellite network); an operator display device 10 (which is capable of displaying real time or live data received from the communications hub 9 or AGM 1); a satellite communications network 13 (which enables world-wide communications); a satellite gateway 11 between the satellite network and the Internet; and a control or server 12 to collect, store, and disseminate system updates and information. Each of these components is further described below.

Above Ground Marker (AGM):

The AGM or remote telemetry unit 1 of detection system 101 includes a means for determining the geographical location of the AGM 1 (to assist the system in identifying which AGM 1 the communications signals are coming from). The AGM 1 also includes: multiple means for detecting a pig 40 traveling underground in close proximity to the AGM 1; one or more means of communicating with the communications hub 9 and the display device 10; and a means for communicating via the satellite network 13.

Figure 5:
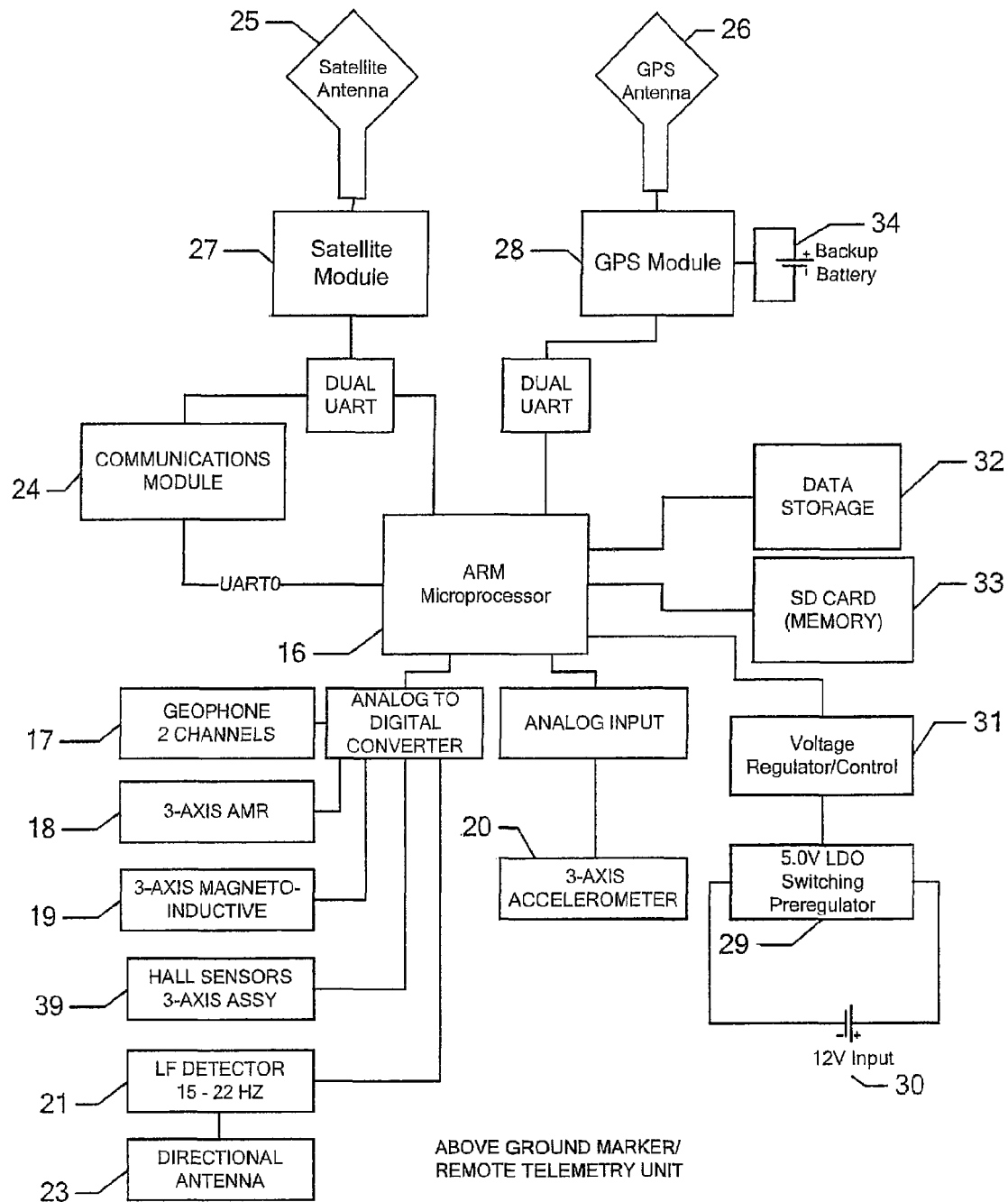
FIG. 5 is a schematic of an above ground marker and/or remote telemetry unit of the tracking system of the present invention.

In the illustrated embodiment, and with reference to FIG. 5, the AGM 1 may include one or more circuit elements, such as printed circuit boards or elements or substrates with circuitry established thereon. The circuit board may be mounted at or in and substantially encased in a housing or casing. AGM 1 includes a satellite antenna 25 and a GPS antenna 26, with the satellite antenna 25 being electrically connected to or in electrical communication with a satellite module 27 and the GPS antenna 26 being electrically connected to or in electrical communication with a GPS module 28. The satellite module 27 and GPS module 28 may each be electrically connected to a respective dual universal asynchronous receiver/transmitter (UART) for connecting the modules to a microprocessor or control circuit 16 of the AGM 1. The AGM 1 includes the global positioning system (GPS) module and antenna to provide geo-positional information regarding the geographic location of the AGM 1 when it is deployed in the field. Optionally, the AGM 1 may be pre-programmed with a surveyed position prior to or during deployment of the AGM 1, and/or the AGM 1 unit may confirm the particular unit has been deployed at the correct or designated location. In the event the AGM 1 has not been deployed in the correct or designated location, the system 100 may generate a notification message to notify tracking personnel of the error.

Microprocessor 16 is operable to receive information data from satellite module 27 and GPS module 28, and may generate a control output in response to the received or input information data. The control output may be communicated to the satellite module 28 for communicating (via satellite 13) to the server 12 and/or the tracking vehicles 14, as discussed in detail below. Microprocessor 16 is also connected to a communication module 24 (such as a BLUETOOTH® module or other suitable short range communication module) to communicate to the display device of the nearby tracking vehicle (such as either a GPS display of the vehicle or a PDA or other suitable display device associated with the respective tracking vehicle or communications hub 9). The communication module 24 may receive the control output of microprocessor 16 (for communication of the signal or signals indicative of the detection of the pig 40) or may receive an input from satellite module 27 (such as for communication of signals from the server or control that are indicative of the detection of the pig 40 at or near the tracking vehicle 14 or at another location remote from the tracking vehicle and/or of the geographical location of the other tracking vehicles or the like).

As mentioned above, any or all of the conventional or known detection methods have limitations that reduce their effectiveness. It can be demonstrated that a set of three magnetic sensors can provide a three dimensional analysis of a pig's movement through a pipeline. Similarly, an accelerometer triad is capable of "listening" to sounds in three dimensions which can also reveal important clues about the pig's movement in the proximity of the AGM. This information enables a device to determine with better accuracy, when the pig is directly under or has passed the AGM.

AGM 1 of tracking system 100 includes multiple detection means or devices or systems, including: magnetic detection devices and a low frequency (LF) detection device 21. The magnetic detection devices may comprise any suitable magneto-responsive device or sensor, such as a magneto-resistive sensor or sensors, such as a three-axis anisotropic magneto-resistive sensor 18, or other magnetoresistive sensor, or such as a magnetocapacitive sensor, a magnetoinductive sensor (such as a three-axis magneto-inductive sensor 19), a fluxgate sensor, or a Hall Effect device or sensor 39, and/or the like, without affecting the scope of the present invention. The LF detection device 21 may comprise any suitable sensor or device, such as an extremely low frequency electromagnetic detector, such as an electromagnetic detector that detects electromagnetic frequencies in a range of about 15 Hz to about 22 Hz or thereabouts (although other frequency ranges may be detected via other selected detectors depending on the frequency output of the LF transmitter carried by the pig or pigs 40 to be tracked by the tracking system 100). The magnetic sensors and LF electromagnetic detector 21 are connected to the microprocessor 16 via an analog to digital converter. The AGM 1 also includes an acoustic sensing device or system, which, in the illustrated embodiment, includes an accelerometer 20, such as a three-axis accelerometer (connected to the microprocessor 16 via an analog input), for detecting and measuring ground vibrations, and a geophone 17, such as a two channel geophone or the like (connected to the microprocessor 16 via the analog to digital converter), for detecting and listening to underground sounds.

Microprocessor 16 may also be connected to or in communication with a data storage device 32 and/or a secure digital (SD) memory card 33 or the like, so that the microprocessor may store data and/or may access or retrieve stored data. The AGM 1 may be connected to a power input 30, such as a 12 volt power supply or the like. In the illustrated embodiment, the power input 30 is connected to a switching pre-regulator 29, which in turn is connected to a voltage regulator/control 31. Optionally, the AGM 1 may include a battery 34, which may provide primary power to the AGM 1 or backup power if the power input 30 is interrupted.

The power control circuitry of the AGM 1 preferably allows for shutting down of the internal devices until they are needed. This saves considerable power allowing the unit to sit idle for an extended period of time until it is needed. For example, the AGM 1 may be capable of running in a hibernation, or sleep, mode that allows the unit to be in the field for extended periods of time prior to a pigging operation. A hibernation mode may allow the AGM 1 to operate using minimal power for weeks at a time. The server 12 or central monitoring station 35 can send a command via satellite 13 to put the AGM 1 in sleep mode or to wake it up. The new instructions may direct the unit to schedule more checks for new instructions or to begin monitoring the pipeline 2 at a predetermined time. However, the unit is not limited to these instructions.

In order to detect a variety of types of pigs 40, a single AGM 1, capable of multiple detection methods, can be used to detect the passage of virtually any pig 40. Such a device using multiple detection methods requires placing only one common or universal detection device, so that tracking personnel cannot mistakenly place the wrong AGM 1. Also, in most cases, a multidisciplinary approach is more likely to detect the device by a plurality of sensors, thereby giving the tracking team multiple indications of the pig's 40 approach and passage. In addition to the increased likelihood of detecting the pig 40, multi-axis data provides a more accurate assessment of the pig's movement in the vicinity of the AGM 1. Also, because some pigging operations involve more than one pig 40, having a more complete "signature" would help the team to ascertain that they are monitoring the correct or targeted pig and discerning between different pigs used in a multi-pig operation.

Figure 2:
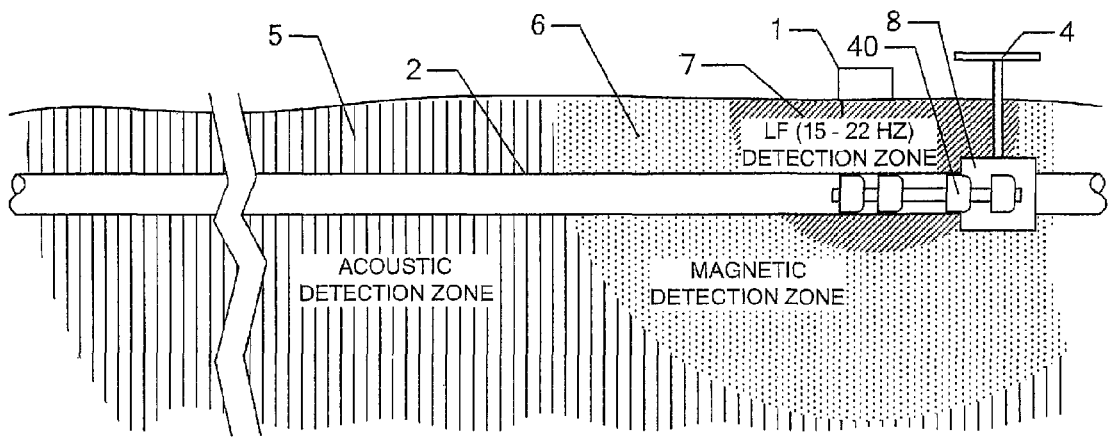
FIG. 2 is a schematic of the tracking system of the present invention, showing the conceptual detection zones associated with the tracking system of the present invention.

In the illustrated embodiment, and as shown in FIG. 2, the above ground marker or AGM 1 utilizes three classes of detection devices or systems. The detection systems include an acoustic detection device or system that detects sounds or vibrations within an acoustic detection zone 5, a magnetic detection device or system that detects the magnetic field generated by the pig 40 within a magnetic detection zone 6, and a electromagnetic frequency detection device or system that detects the low frequency (LF) electromagnetic transmission 41 of the pig 40 within a LF detection zone 7. As can be seen in FIG. 2, the acoustic detection zone 5 typically extends a greater distance from the AGM 1 than the magnetic detection zone 6, which typically extends a greater distance from the AGM 1 than the radio or LF detection zone 7, which is substantially immediately beneath the AGM 1. The actual range of the zones of detection are variable based on pipe geometry, depth of burial, soil conditions, transmitter characteristics, and other factors. The AGM 1 may detect the approach of a pig 40 when the pig is at a greater distance via the acoustic detection device or system, and detects the pig via the magnetic detection device or system as the pig gets closer to the section or region of pipe 2 at or below or near the AGM 1, and then detects the pig via the low frequency electromagnetic detection device or system 21 when the pig is substantially at or below the AGM 1, thereby providing an advance detection of the pig and a detection of when the pig is at or immediately or substantially immediately below the AGM 1.

The acoustic detection components include a geophone 17 and a three-axis accelerometer 20. The geophone is analogous to a microphone and detects sound vibrations coming from within the earth. Data from the geophone is processed by an analog to digital converter before being processed in the microprocessor. The microprocessor records the data in memory and feeds live data from the AGM via the audio channel to one of two devices. Audio can be fed to either a communication headset (such as a BLUETOOTH® headset or the like) or to the communications hub where it is forwarded to the tracking vehicle's FM radio receiver. Additionally, the AGM is equipped with a three-axis accelerometer that is also capable of detecting vibrations coming from within the earth. The accelerometer provides three channels of analog data to the microprocessor, which in turn provides three output channels for three-dimensional analysis of vibrations caused by the pig 40 moving through the pipeline 2.

The magnetic detection devices may include any or all or any combination of suitable magnetic detection sensors or devices, such as, for example, a three-axis anisotropic magneto-resistive (AMR) sensor 18, a three-axis magneto-inductive sensor 19, and/or a Hall Effect sensor 39 and/or the like. AMR sensors 18 and magneto-inductive sensors are classed as "Earth's field sensors" and are capable of detecting magnetic fields in the range of 1 micro-gauss to 10 gauss. In combination, the AMR sensors 18 are capable of sensing a magnetic field in three dimensions, providing three vectors for analysis.

Prior art devices rely on a single magnetic vector, and prior art magnetic markers monitor the magnetic field and attempt to detect a sudden reversal in the magnetic field. In an ideal situation, a single sensor may work well for its intended purpose. However, in many cases, a single sensor provides ambiguous data. By measuring the magnetic field in one dimension, a prior art marker measures the vector sum of the magnetic field. Depending on the polarity of the magnetic field and the orientation of the magnetic sensor, the vector sum can exhibit several different characteristic curves. Equipping the AGM 1 of the present invention with AMR sensors 18 enables the device to monitor the magnetic field in three dimensions. With three vectors to consider, the device is able to capture the information in greater detail increasing the likelihood of correct analysis or interpretation.

The low frequency electromagnetic detector 21 uses a directional antenna 23 to receive low frequency signals transmitted by the pig LF transmitter 42. Typical pig transmitters use frequencies ranging from 15 Hz to 22 Hz. To enable the AGM 1 to selectively monitor pigs, the low frequency detector 21 is programmable by the pig tracking team. The tracking system of the present invention allows tracking personnel to program the AGM 1 to receive two frequencies on each of two channels, thereby enabling the AGM to detect up to four distinct frequencies controlled by phase locked loop circuits. The system may have a programming resolution of about 0.02 Hz (or other suitable resolution) with a bandwidth of about 0.5 Hz (or other suitable bandwidth). In this manner, relying on frequency resolution and electromagnetic detectors allows the system to resolve, identify, and differentiate between pigs carrying transmitters transmitting on slightly different frequencies, varying frequencies, or combinations of frequencies, and thereby allowing identification of the passage of specific pigs. Additionally, the device preferably includes a field-programmable low-pass filter to eliminate a large proportion of background noise generated by power transmission lines and the like. All programming of the device may be accomplished using a computer or another interface device.

Optionally, and desirably, the AGM 1 may be capable of operating in three or more modes of operation: a manual mode, a semi-automatic mode, and a full-automatic mode. In addition to the three modes of operation, an optional communications hub 9 can enhance operations and logistics by increasing the tracking team's mobility within the vicinity of the AGM 1 while waiting for pig passage. Operations within each of these modes are discussed in detail below.

Figure 3:
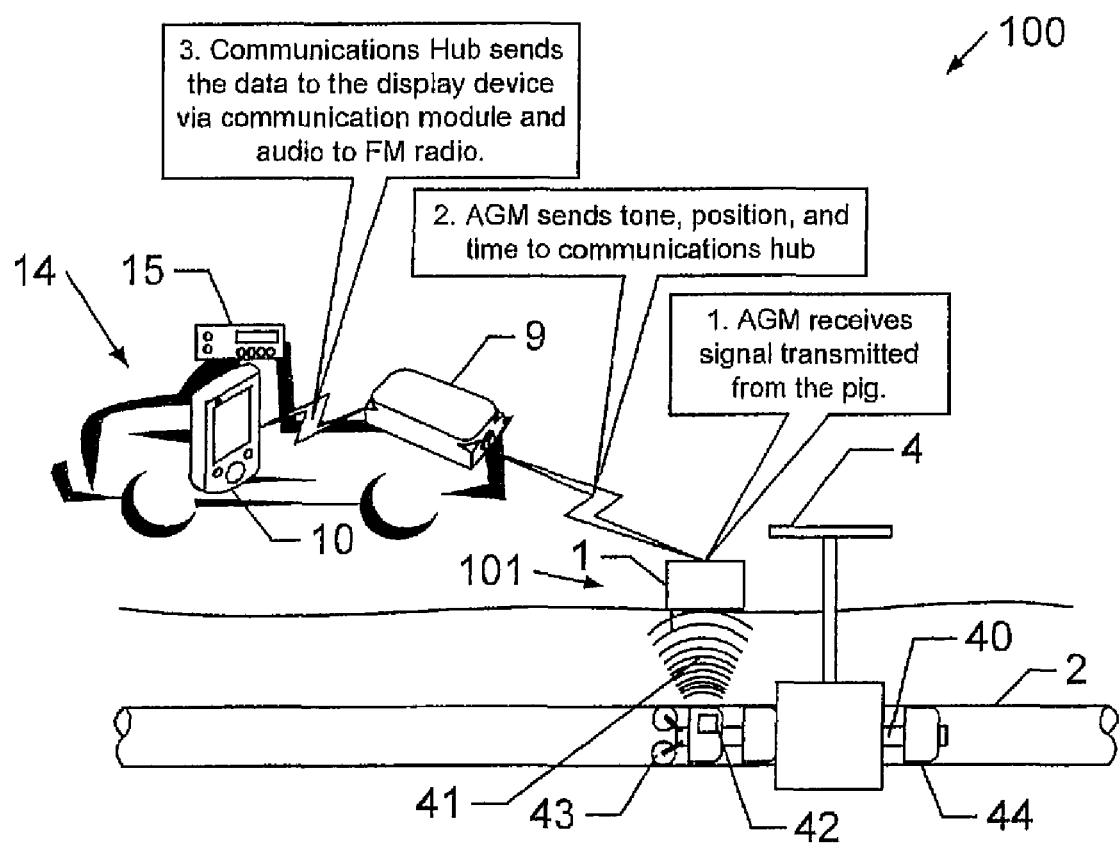
FIG. 3 is another schematic of the tracking system of the present invention, showing the communication of signals to a tracking vehicle.
Figure 4:
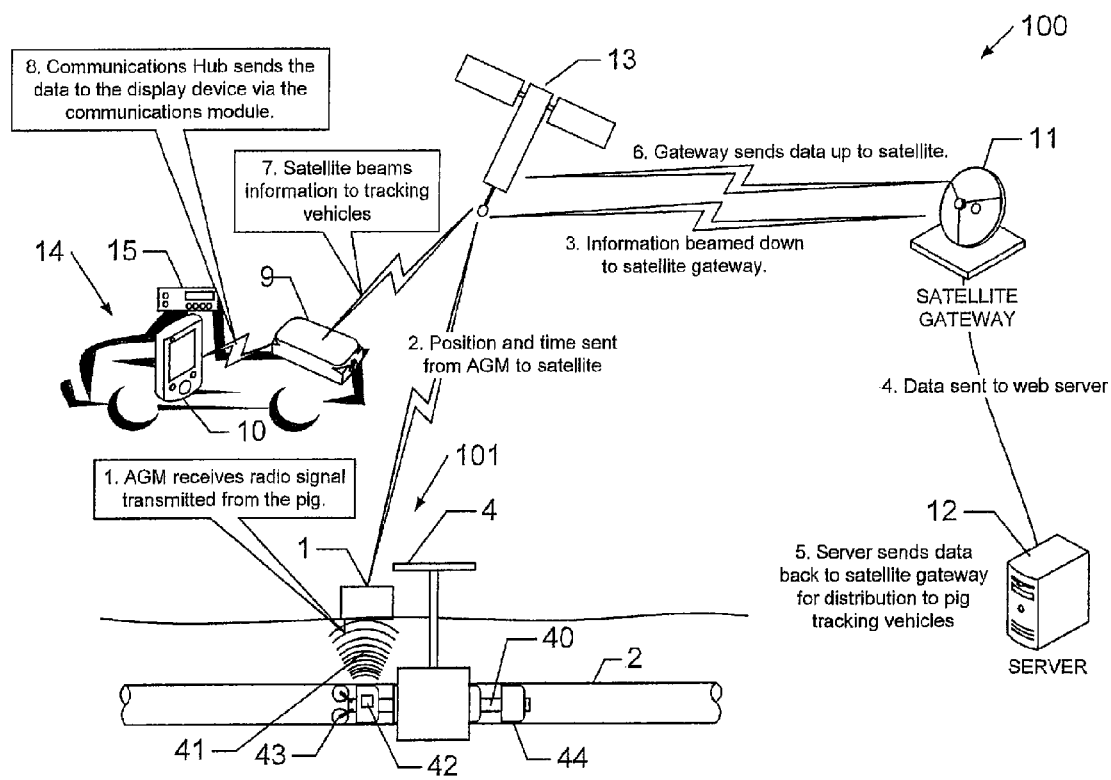
FIG. 4 is another schematic of the tracking system of the present invention, showing the communication of signals to a central server and a tracking vehicle via a satellite network.

As shown in FIGS. 3 and 4, when the pig 40 is at or near the AGM 1, the AGM 1 may receive the low frequency electromagnetic signal from the pig 40, whereby the AGM 1 may communicate a signal to a central server 12 (such as via a satellite network 13, discussed below) and/or to a remote communications hub or control unit 9, such as a communications hub on a nearby tracking vehicle 14 that may be at or near the AGM 1. The AGM 1 communication signal may include the location of the pig, the time of passage of the pig, and the method or mode of detection. As also shown in FIGS. 3 and 4, the communications hub 9 may transmit or communicate or send the received data to a display device 10 (such as a PDA or other suitable display device) of the tracking vehicle 14, such as via a short range radio frequency communication protocol or the like, such as via a BLUETOOTH® communication protocol or wireless link or the like, and/or may send an audio signal to the FM radio receiver of the tracking vehicle or other audio device of the tracking vehicle. For example, the AGM 1 communication signal may include audio data or signals (such as signals indicative of sounds recorded by the detection devices or systems of the AGM 1 as the pig 40 approaches and passes the AGM 1) and the communications hub 9 may transmit or communicate the audio signal information to an audio device or speaker of the communications hub 9 or tracking vehicle (such as the audio system or radio 15 of the tracking vehicle).

Figure 9:
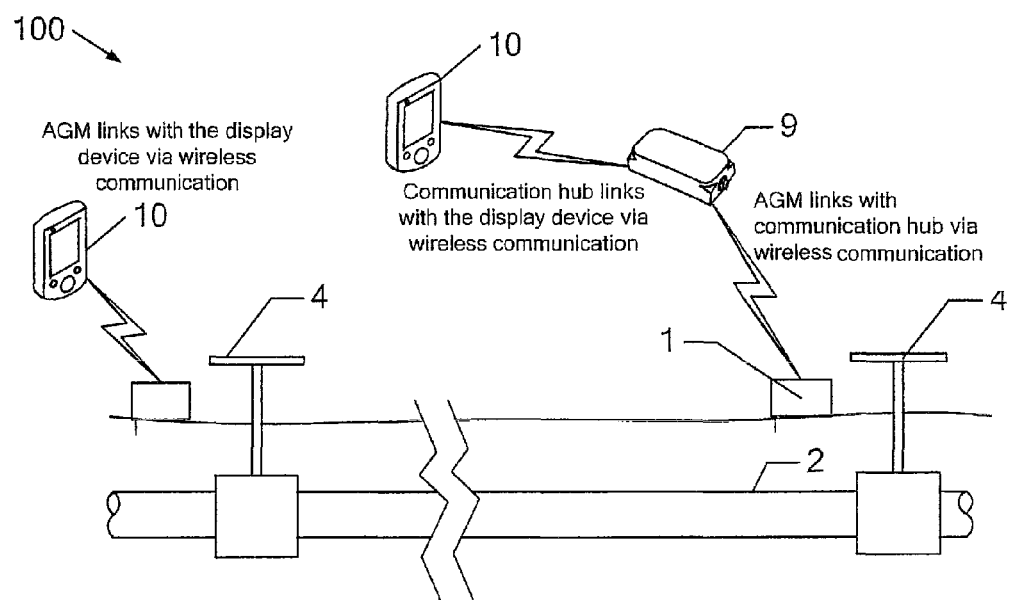
FIG. 9 is a schematic of an above ground marker and tracking system in accordance with the present invention, showing the communication between the AGMs and display devices.

As shown in FIGS. 3 and 9, the AGM 1 may communicate data (such as, for example, tone, position and time data or the like) to the remote communications hub 9 via a wireless communication. The communications hub 9 communicates the data to the display device 10 as described above. Optionally, and as shown in FIG. 9, the AGM 1 may communicate data directly to a suitable display device (which may include the receiver and processing or control circuitry), whereby the communications hub 9 and associated short range communication protocol module may be obviated.

As shown in FIG. 4, the AGM 1 also or otherwise communicates the position and time data to a satellite constellation or network 13, which beams or transmits the data or information to a web server or central control unit 12 via a satellite gateway 11. The server 12 processes the data and communicates the data, such as in processed packets of information (such as via short burst data packets), back to the satellite gateway 11 for distribution to the pig tracking vehicles 14. The gateway 11 communicates or transmits or sends the data to the satellite 13, which beams or transmits the information to the communications hub 9 of the tracking vehicle or vehicles 14. The communications hub 9 may then transmit or communicate the data or information to the display device 10 and/or radio 15 of the tracking vehicle 14, such as via a short range communication protocol or the like, such as via a BLUETOOTH® communication protocol or wireless link or the like, or via a hard-wired connection, so that the person or persons in the tracking vehicle 14 may view and/or listen to the information communicated, as discussed in detail below.

Thus, the AGM may communicate to a remotely located (i.e., not at or near the AGM or the tracking vehicles) control unit or server and/or to a portable control unit or hub that is at or near one or more tracking vehicles, to communicate information pertaining to the detection of the tracked pig in the pipeline and/or the geographical location of the particular AGM that detects the pig, as discussed in detail below.

Communications Hub ("Com Hub"):

The communications hub or control unit 9 extends the range between tracking personnel and a monitored AGM 1, allowing the tracking personnel to monitor the AGM 1 from up to 100 meters away (or more or less depending on the communication link between the AGM and the communications hub). Without the communications hub 9 (such as in applications where the display device may receive the communication signal directly from the AGM), tracking personnel would be required to remain within approximately 10 meters of the AGM 1 to properly monitor the device.

The communications hub 9 may be installed on a tracking vehicle (such as, for example, a pickup truck, snowmobile, all-terrain-vehicle, or helicopter or other suitable vehicle) to monitor a nearby AGM 1. The portable communications hub 9 is preferably equipped with a GPS receiver for determining the position of the respective tracking vehicle. A satellite modem of the communications hub 9 is used to transmit and receive short burst data (SBD) packets via the satellite network. The SBD packets travel via satellite to the Internet server that processes the data for redistribution to the field.

Each communication hub also includes a communication module (such as a BLUETOOTH® module or other suitable short range communication device or module or protocol) for simultaneously communicating with the AGM 1 and the display device 10, such as a PDA or handheld computer or other display device or screen or monitor or the like. Preferably, the display device will also function as an input device or interface capable of transmitting commands back to the communications hub 9. The communications hub 9 thus receives an input signal from the server (via the satellite network), or the communications hub may receive an input signal directly from the AGM 1 via a wireless communication, and displays the information at the display device of the hub or tracking vehicle. The communications hub 9 may also communicate an audio signal (received from the server via the satellite network or from a nearby AGM 1) to an audio device, such as a radio or the like of the hub or tracking vehicle.

The communications hub 9 enables the tracking crew to (i) monitor the status and sensory data of a nearby AGM 1 from within the vehicle; (ii) monitor the position of other tracking crews regardless of geographic separation; and/or (iii) remotely monitor the progress of an inspection tool as it detected by remote AGMs 1.

Display Device:

The display device 10 is capable of selectively communicating with either the AGM 1 (as shown in FIG. 9) or the communications hub 9 (as shown in FIGS. 3, 4 and 9). The display device allows tracking personnel to monitor a graphical output of data detected by the sensor or sensors of the AGM 1. The display device is capable of receiving wireless communications from the AGM 1. The wireless communications may be transmitted by BLUETOOTH® communication protocol or wireless link or the like. The communications may include data representing the sensor data detected or collected by the AGM, including geophone data, magnetic field data in three axes, and low frequency electromagnetic field data. The low frequency electromagnetic field data is typically created by a special transmitter 42, carried by the pig or inspection tool, and capable of transmitting such a field in the range of approximately 15 Hz to 22 Hz. Tracking personnel monitor the display device 10 to observe the various input channels, watching for a characteristic signature of pig passage. The display device enables the operator to examine the streaming data to determine the moment the pig 40 passes underneath, or substantially underneath, the AGM 1. Optionally, the display allows the operator to communicate with the AGM 1 in order to confirm (qualify) or disqualify a pig passage event.

Upon identification of pig passage, the operator notifies the central monitoring station (CMS) 35 of the passage event. At that time, the operator may retrieve the AGM 1 in order to redeploy the device at the next assigned AGR 4, or the AGM may be left at that location for detecting another pig at a later time or in another nearby or local pipeline.

The display device in combination with the communications hub also allows tracking personnel to send text messages to other tracking personnel. The display device is capable of displaying a map of the area with a pipeline overlay including the last reported pig position, positions of each deployed AGM 1, and each communication hub 9. This allows the entire tracking team to monitor the pig's progress and the location of other tracking personnel in relation to their own position.

Satellite Network:

To communicate between the AGM 1, or the communications hub 9, and the CMS 35, the system 100 relies on a constellation of low earth orbit (LEO) satellites and satellite transceivers. Sometimes, the AGMs are located in remote areas that have no ground-based communications infrastructure, such as cellular telephone towers or radio repeaters, to handle communications to the tracking vehicles. Mountains and other terrain may impose further limits on the effectiveness of two-way radio communications. The tracking system of the present invention overcomes these communication barriers by relying on low earth orbit (LEO) satellites and satellite transceivers. By sending this data through the satellite network 13, satellite gateway 11, and the Internet, the tracking system 100 of the present invention allows communication of the pig data to the tracking vehicle or vehicles, regardless of geographical location of the AGM 1 and/or tracking vehicles and the terrain and the like. This satellite network 13 carries two-way communications from anywhere to anywhere on the globe.

Central Monitoring Station (CMS):

The central monitoring station (CMS) 35 of the system of the present invention is a central receiving point for tracking data collected and transmitted by the AGM 1 or communications hub 9. The CMS may include a web server 12 or control and related software, and receives information via the satellite network 13, satellite gateway 11, and the Internet. Each time an AGM 1 detects a pig passage event, the AGM 1 communicates the data and the CMS receives a message (such as in an electronic or digital message) containing data descriptive of that detected event. The server 12 collects the data and displays the pig's detected geographic location and speed, such as at a display at the CMS 35. The CMS allows the pipeline operator to simultaneously monitor the progress of one or more pigs traveling through his pipeline system by using a web browser and the Internet. The web application can use a combination of satellite imagery, topographic maps, and street-level maps. The web application may overlay the map or maps with the path of the pipeline 2, locations of pump stations, pre-surveyed AGM 1 locations and other points of interest.

Figure 6:
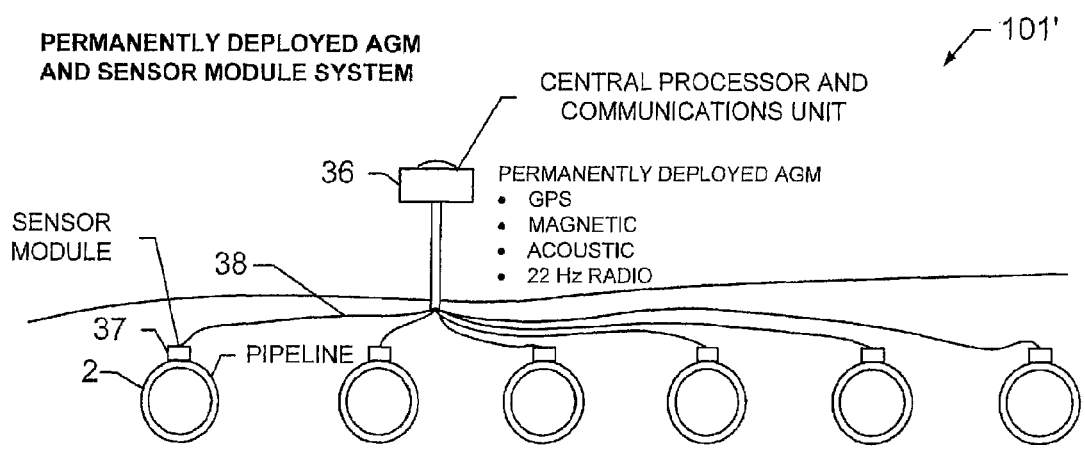
FIG. 6 is a schematic of a permanent above ground marker installation for multiple pipelines in accordance with the present invention.
Figure 7:
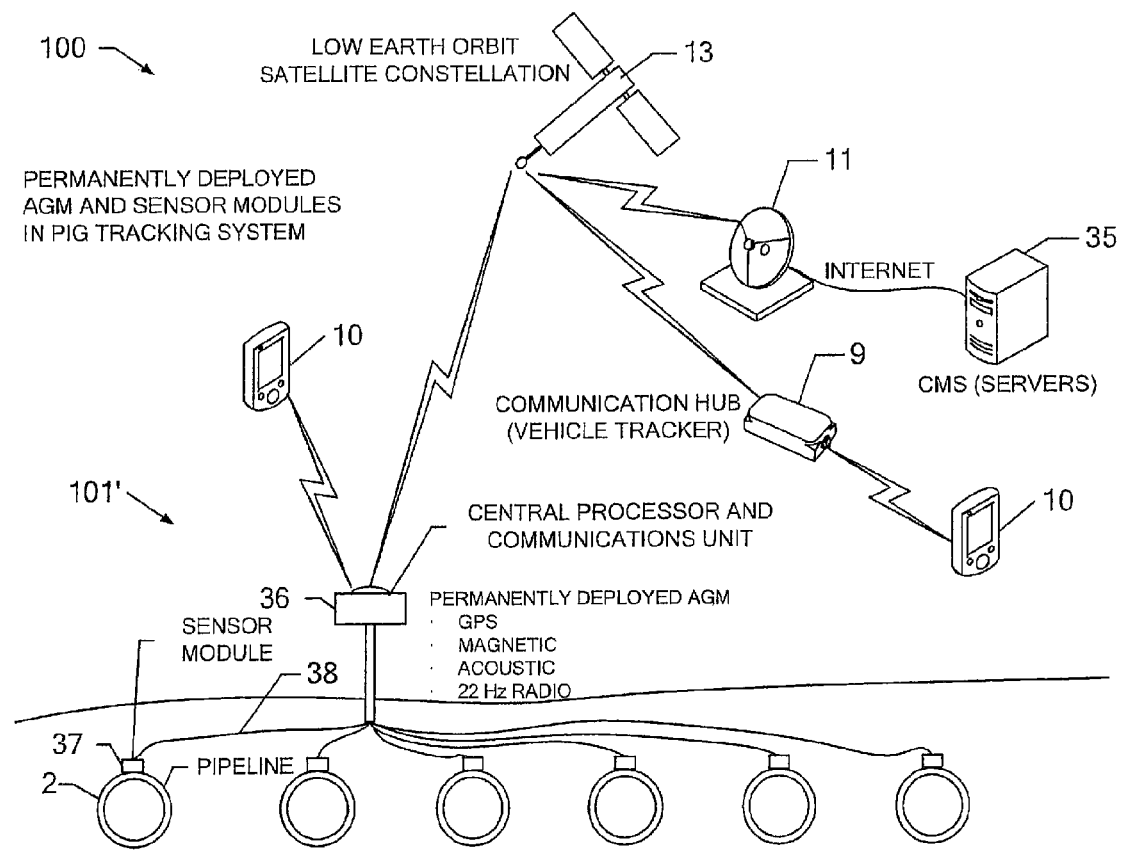
FIG. 7 is a schematic of the permanent above ground installation for multiple pipelines, showing the communication with the remainder of the pig tracking system in accordance with the present invention.

Permanently Installed AGM (Central Processing and Communications Module):

Optionally, and with reference to FIGS. 6 and 7, a pipeline operator in some cases may wish to permanently install an AGM system or detection system 101' in a location with one or more pipelines 2. The permanent AGM or central processing and communications module (CPCM) 36, combined with multiple sensing modules 37, can continuously monitor several pipelines 2. The sensing modules may be placed directly on the pipeline 2 and communicate with the CPCM 36 via a hardwire connection or other suitable communication link. The permanent AGM system 101 can be connected to a power supply with battery backup for continuous operation. The CPCM 36 is capable of reporting all pig "traffic" to the central monitoring station (CMS) via satellite 13. By using one satellite modem 27 to handle communication tasks for several detection modules, an operator can reduce satellite subscription fees and airtime charges.

The satellite modem 27 is capable of bidirectional communication, thereby facilitating remote updating or reprogramming of the AGM software. The CPCM 36 may also be capable of supporting a satellite telephone handset to allow pipeline operators or a tracking team to place or receive telephone calls in remote installations.

Remote Sensor Modules for Permanently Installed AGM:

Because many pipeline rights-of-way contain multiple pipelines, the present invention provides enhanced tracking of the pigs in the pipelines by having multiple sensing pods or modules connected to a single data processing and communications unit. Each sensor module 37 contains similar sensing devices as the portable AGM 1 (acoustic, magnetic and low frequency detection) and offers similar or the same, or better, detection capability based on the fact that the modules may be placed directly on top of or substantially immediately adjacent to the pipeline 2. The remote sensing modules are powered by the CPCM and communicate with the CPCM via wired Ethernet 38 or other suitable network protocol. The permanent nature of this installation lends itself to an accurate (geographical) survey in three dimensions. Having the location in three dimensions aids the benchmarking (caging) process significantly, particularly for mapping pigs and other tools with inertial navigation systems (INS) that need to be caged (or baselined) in three dimensions. The AGM system 101' may be substantially similar in features and functions as AGM system 101, and may communicate with the communications hub 9, display device 10 and/or server 12 of system 100 in a similar manner as AGM system 101, such that a detailed discussion of the AGM systems or detection systems need not be repeated herein.

Operation of the Tracking System:

Typical operation of the tracking system 100 occurs while the pig is moving through the pipeline 2. An auxiliary function of the system is to locate a pig 40 that is stationary in the pipeline. The pig locating function is discussed below.

During deployment of the AGM, the tracking team places the AGM 1 generally above the pipeline 2, preferably at a pre-surveyed reference point. The onboard GPS receiver 28 of the AGM 1 acquires the GPS satellite signals and determines the current geographical location of the AGM 1. If the coordinates of the reference point have been programmed into the AGM 1, the AGM 1 compares the current detected geographic location with the preprogrammed location to see if the difference is outside of limits. If the difference is excessive, the AGM 1 may communicate a signal or alert indicating the discrepancy or may communicate the current geographical location or coordinates of the deployed AGM 1. If the AGM 1 is at the correct or predetermined location, the team leaves the unit in position until the inspection tool or pig passes that point.

During operation of the system 100, the system involves three processes: detection, notification, and team positioning. The first step is detecting the pig 40 as it passes beneath an above ground marker (AGM) 1. The second step is notifying interested team tracking members when the tool passes beneath the AGM 1. The third step, team positioning, allows tracking teams to monitor the locations of other tracking teams so they can coordinate efforts to monitor the progress of the pig 40 and redeploy AGMs 1 as required.

Detection:

Prior to a pigging operation, a survey team preferably establishes reference points along the pipeline 2. These reference points are generally located at or near an above ground reference (AGR) 4 that can be closely linked to an underground pipe feature. The survey team establishes the reference points prior to the pigging operation. Upon commencement of the pigging operation, the tracking team deploys an above ground marker (AGM) 1 at each reference point prior to the pig's arrival. The AGM 1 then detects the approach and subsequent passage of the pig 40 via the multiple detection devices or systems, which may include several sensors, such as an acoustic sensor or sensors, a magnetic sensor or sensors, and a low frequency electromagnetic field detector or sensors or LF detection circuit.

In the illustrated embodiment, there are three types of magnetic sensors: anisotropic magneto-resistive (AMR) sensors 18, magneto-inductive sensors 19 and Hall Effect sensors 39 capable of detecting and measuring magnetic fields in three axes. Measuring magnetic fields in three axes provides the necessary data for three-dimensional analysis.

As discussed above, the AGM 1 also senses acoustically. The acoustic sensors include a three-axis accelerometer 16 that measures ground vibrations and a geophone 17 for listening to underground sounds. Both of these sensors pick up the vibrations (sound and motion) of the tool traveling through the pipe. Having three-axis accelerometers provides the necessary seismic data for three-dimensional analysis. The AGM 1 also has a low frequency detection circuit 21 tunable to frequencies ranging from 15 Hz through 22 Hz which are transmitted by many inspection tools and various types of pigs.

The microprocessor receives the outputs of the sensors and processes the information coming into the AGM 1 from the sensors. The microprocessor stores the data collected during passage events in the data storage device and communicates the data to the server 12 via the satellite network 13. For example, the AGM 1 may communicate to the satellite network via the satellite modem 27, which may send and receive short burst data transmissions. The AGM 1 may also communicate or transmit the data or information to the nearby tracking vehicle or communications hub 9 via the communication module 24.

As the pig approaches the AGM 1, the acoustic detection circuits (such as the geophone 17 and accelerometers 20) will likely provide the first indication the tool 40 is approaching. Often, the AGM 1 will detect the noise of the tool traveling through the pipe several minutes in advance of the tool's arrival. Under some conditions, the geophone may detect the tool from miles away. The AGM 1 may digitally record the detected audio signals and provide the audio signals to the tracking vehicles 14. Providing the audio to the tracking teams allows technicians the opportunity to perform other functions without having to visually monitor any equipment as the tool is approaching. As the audio becomes louder and more distinct, tracking personnel increase their vigilance and monitor the display devices as well as the audio signals. In some cases, a discernable Doppler shift in the audio channel alone could provide a characteristic signature of pig passage.

When the tracking system 100 is tracking magnetic pigs 40 with magnetic sensors, a second indication of the tool's approach comes from the magnetic sensors 18, 19, 39 in the AGM 1. As the pig 40 gets closer to the AGM 1, the magnetic sensors detect magnetic flux fields from the tool. These sensors constantly monitor the magnetic field around the AGM 1 and record data as the pig 40 approaches and passes. The data provides a characteristic signature of the approach and passage of the pig 40. For example, one such characteristic signature could be a reversal of the magnetic field. Multi-dimensional analysis of the magnetic field provides additional characteristic signatures or signature elements which enhance the ability to detect and pinpoint tool passage.

The final detection method involves an electromagnetic direction circuit 21. Many inspection tools contain an electromagnetic transmitter 42 that transmits a low frequency oscillating magnetic field in the range of 15 Hz to 22 Hz. Frequencies in this range penetrate metal pipes and earth for several meters depending on the strength of the signal and characteristics of the earth near the transmitter. Should the tool become lost, this signal 21 may be the only means of detection. The AGM 1 monitors the selected frequency and phase lock loop circuits lock onto the frequency as the pig 40 nears the AGM 1. The AGM 1 records the strength of the low frequency signal as the pig 40 approaches and passes. Like the magnetic sensors, the low frequency signal 41 provides a characteristic, recognizable signature of pig passage. To produce a characteristic signature, increase the range or likelihood of detection and increase the accuracy of detection, the AGM 1 may utilize one, or more than one, orthogonally positioned directional antennae 23.

The AGM 1 may also include one or more indicator lights that can indicate a condition of the detection circuit acquiring and locking onto the signal 41. The tracking team can program the detection circuit to selectively acquire a specific signal that will cause the indicator light or lights to illuminate. When the AGM 1 "locks onto" the low frequency signal, the microprocessor in the AGM 1 causes the pig passage indicator to illuminate for as long as the AGM 1 is locked onto the pig transmitter's signal. This gives the team the ability to discriminate between different pigs (provided each pig is using a unique frequency or combination of frequencies).

As mentioned above, the system is capable of operating in three modes: manual, semi-automatic, and automatic. Each of these modes operates slightly differently regarding detection. For example, in the manual mode, tracking personnel must monitor the AGM 1 either visually or by using the display device or by monitoring the audio output through the tracking vehicle's FM radio 15. When the operator determines the pig has passed the AGM 1, the operator manually notifies the central monitoring station 35.

In the semi-automatic mode, the AGM 1 uses one or more mathematical algorithms to determine the moment of passage. Upon pig passage, the AGM 1 requests confirmation from tracking personnel. Tracking personnel qualify the data and confirm or reject the AGM's determination. Upon manual confirmation, the AGM sends the data to the central monitoring station via satellite.

In the automatic mode, the AGM 1 automatically analyzes the data with mathematical algorithms to determine the moment of passage. Upon detection of passage by one or more detection methods, the AGM automatically sends the data (detection method, time, position, and AGM identification) to the central monitoring station 35 via satellite 13. It is not necessary for any tracking personnel to be present at the AGM when the AGM is operating in the automatic mode.

Notification:

As the AGM 1 monitors the sensors, it processes the data and records each sensor reading in onboard memory. The AGM 1 also transmits sensory data to the communications hub 9 in a nearby tracking vehicle 14 or to a display device 10 in the absence of the tracking vehicle with a communications hub 9 (such as shown in FIG. 9). The communication hub allows tracking personnel to monitor the AGM 1 from within the nearby tracking vehicle. For example, the AGM 1 may process the sensor data and send it via a short range communication protocol to the nearby communications hub 9, which distributes or communicates the data to the display device 10 or handheld computer and FM radio receiver 15 of or at the nearby tracking vehicle. For example, the communications hub 9 may relay the information from the magnetic sensors to the handheld computer, whereby the handheld computer may display magnetic readings in a graphic format (such as shown in FIG. 6). As the pig 40 passes the AGM 1, the technician will see the lines of the graph cross each other as the magnetic field reverses.

Optionally, when the AGM 1 acquires the electromagnetic signal from the pig's transmitter 42, the AGM 1 may synthesize an audible tone and superimpose the tone on the acoustic signal. The combined acoustic signal and audible tone are sent by the short range communication protocol to the nearby communications hub 9, which converts the signal to an FM signal. By monitoring an FM radio, the tracking team can audibly detect the passage of the pig 40.

Upon passage of pig 40, the AGM 1 also provides notification to the server or central monitoring station 35. When the AGM 1 recognizes pig passage (by the one or more detection methods), the AGM 1 automatically sends a message via satellite network 13 to the CMS. This notification is a short burst data packet via satellite 13 to the CMS and contains the time of the passage, the position of the AGM 1, and the method of detection (acoustic, magnetic, or electromagnetic).

Figure 8:
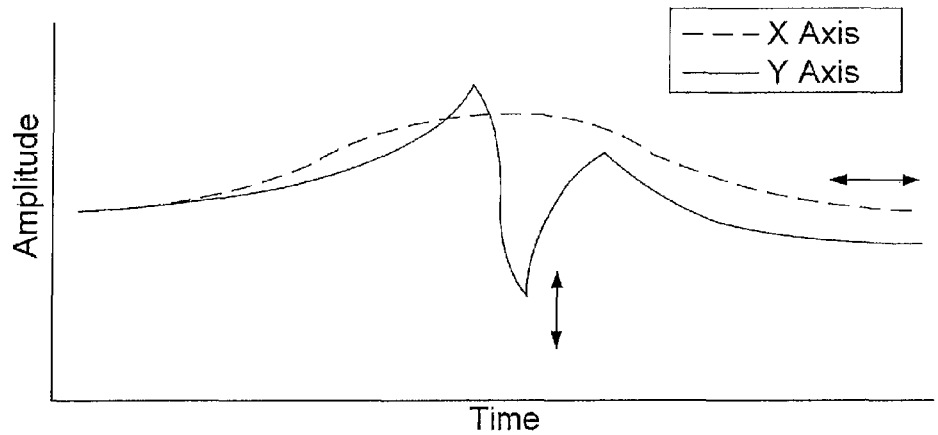
FIG. 8 is a graphical representation of low frequency amplitude during pig passage showing the data gathered from orthogonally oriented antennae in accordance with the present invention.

The packet is communicated through the satellite network 13 and to a terrestrial gateway 11, eventually reaching an Internet server 12 which logs the detected pig's position, time, and detection method. CMS personnel can monitor the server 12 to keep track of the pig's progress through the pipeline 2. Prior to each run, the AGM was oriented differently to illustrate the effect of the device's orientation on its ability to detect the pig using low frequency detection. Optionally and preferably, the AGM can be equipped with orthogonally oriented antennas to optimize detection capabilities. FIG. 8 shows a graphical representation of LF detection data gathered by such a device.

Some known above ground markers of known systems exist with the capability of relaying detection information to a central monitoring station, but none of the known or conventional systems automatically provide that information back to the teams in the field. The pig tracking system of the present invention, which provides real-time, or near real-time tracking data to teams in the field, regardless of geographical location or local communications infrastructure, provides advantageous and improved logistical efficiency.

To notify teams in the field, the server composes and transmits a message that is transported via satellite/Internet communication loop that includes the position of the AGM 1 that detected the pig 40 and the latest reported positions of the tracking vehicles 14 in the field. The server sends a similar message to each of the communications hubs 9 so that all tracking personnel are informed as to the pig's progress and the locations of the other tracking vehicles. Optionally, the above communications could occur directly from an AGM—communications hub combination via satellite, thereby bypassing the CMS.

Optionally, the system may provide for other communications or messages to be sent between the vehicles and/or AGM and/or server or base or CMS 35. For example, a user or tracking personnel at the AGM 1 or one of the tracking vehicles 14 or at the CMS may input a message (such as a typed message or other alphanumeric message or code or signal), whereby the message may be communicated (along with the AGM data or separate from the AGM data) to the other vehicles and/or central monitoring station, so as to provide one-way and/or two-way communications between the vehicles and the central monitoring station via the satellite network 13 and server 12. The server may receive the communication from the source via the satellite network and may forward or communicate or send the communication to the targeted source. The server may recognize or discern a targeted recipient or recipients of the message and may forward the message to only the targeted recipient/recipients. Such a communication scheme may assist in communication between the tracking personnel in the field so as to enhance the tracking and monitoring of the tracked pig 40. For example, if two tracking vehicles are both near or relatively near to the pig's detected location, the personnel of one of the tracking vehicles 14 may communicate to the others that they will move to that location, so that both vehicles do not arrive at the same location. The communications may be sent and received via the satellite network 13 and the server 12 and thus the personnel may communicate with one another in areas where cell phones and the like may not provide an adequate communication means.

As mentioned above, the system is capable of operating in three modes: manual, semi-automatic, and automatic. Each of these modes operates slightly differently regarding notification. For example, in the manual mode, the operator either sends a message through the system to the central monitoring facility or uses another means such as a cellular telephone, radio transceiver, or satellite telephone to notify the central monitoring facility. Alternately, in the semi-automatic mode, the system interrogates the operator, asking the operator to confirm or qualify the passage event. Upon qualification, the system distributes the pig passage information to the interested parties. Further, in the automatic mode, the system automatically sends the pig passage event data to the central monitoring station via the satellite network and control or server. The AGM 1 immediately sends a short-burst data message indicating pig passage, time of passage, location, and the mode of detection used to determine passage. Tracking personnel receive confirmation of passage via satellite, and the tracking personnel are not required to be at the site during pig passage when the system is in the full-automatic mode.

Web-Based Display:

Optionally, and desirably, the pipeline operator, or tracking team coordinator, can simultaneously monitor the progress of one or more pigs traveling through the pipeline system by using a web browser with Internet access. The web application can use a combination of satellite imagery, topographic maps, and street-level, vector maps. The web application overlays the base maps with information such as the path of the pipeline, the location of pump stations, pre-surveyed AGM locations and other points of interest. Since the AGMs may be placed at multiple mile intervals, the website estimates the position of the pig or pigs by calculating an average speed between the last two AGM reference points. This is readily accomplished because both the distance traveled by the pig and the elapsed time is known between any two AGM locations. Assuming the pig continues to travel at its most recent speed, the system can calculate predictions of pig position. This information can also be used to predict the time of passage at the next AGM location.

Tracking Team Positioning:

Each communications hub 9 regularly communicates its position or geographic location to the central monitoring station or server. As the server receives positional data from tracking vehicles 14 in the field, the server 12 collates the data and sends the data to each of the communications hubs 9 in the field. Each communications hub 9 then processes the positional data and sends the information, such as via a BLUETOOTH® communication protocol or wireless link or hard-wired link or the like, to the display device where an operator can then graphically see the position of the tracking vehicles on a displayed map. Technicians thus can readily identify the locations of other tracking teams and then proceed to the next AGM 1 placement without needlessly approaching a location that is already manned by a tracking team.

Baselining:

The AGM 1 enables technicians to correct inspection data to account for odometer drift occurring while the tool was in the pipe. This process is known in the industry as baselining or caging. The tracking team places an AGM 1 at a pre-surveyed position. The AGM 1 detects the pig, from above ground and without direct contact with the pig, as the pig or tool passes through the pipeline at a known reference point. As the tool passes, the AGM 1 timestamps or records the time of the event. After the pig is removed from the pipeline, the timestamp from the AGM 1 is correlated with the inspection data (log) to locate the point in the log that corresponds with the AGM 1 timestamp. This process is repeated throughout the inspection to provide a series of AGM 1 references where the pig was observed to be at known locations at known times. Using at least two known points and the two corresponding time-designated points from the logged data, the pig's log is mathematically adjusted, or scaled, or post-processed, to match the known physical distance between the two AGM 1 references as determined from pipeline drawings or surveying or other reliable means of determining the actual distance (such as by utilizing baselining aspects known in the art). By using the baselining process, the system can account for odometer errors caused by wear on the odometer wheel 43, odometer slippage, accretions on the odometer wheel, or other factors having a detrimental effect on odometer accuracy.

The accuracy of the baselining process is dependent upon the accuracy of the pig's internal timekeeping device. In order to minimize the uncertainty, tracking personnel synchronize the pig's clock to Global Positioning System (GPS) time prior to inserting the pig into the pipeline. The GPS time signal is an accurate and reliable means of keeping time in the field. To obtain the most accurate time possible, the AGM 1 clocks are synchronized with GPS time using a time-pulse-corrected GPS signal. The time pulse corrected signal overcomes a slight inaccuracy that is evident in equipment utilizing serial time signals, keeping each of the AGMs on a common synchronized time.

The process can be further improved with highly accurate timing devices, including the soon-to-be-commercially-available chip-scale atomic clocks. Extremely accurate clocks are being developed which will increase the accuracy of the pig's timekeeping to one part in ten billion, or 1 second in 300 years. Such high accuracy clocks onboard the pig would simplify the timing and synchronization processes and reduce the positional uncertainty, thereby enabling the pig to operate for a longer duration within the limitations of the pig's onboard memory and battery life.

Pig Locating:

Sometimes a pig 40 may become stuck or a pipeline operator may have a need to temporarily suspend a pigging operation in order to meet production requirements. Either of these situations may require precisely locating the position of the stationary pig.

In the case of suspended pigging operations, the pipeline operator may require directing the pig to travel past a particular valve that can be used to redirect the flow of the product. The tracking team would place an AGM 1 at the valve to detect pig passage. As soon as the tracking team confirms the pig has passed the valve, the valve is closed or switched causing the pig to stop while product is pumped to a different destination. While the pig 40 is stopped and remains in the pipeline 2, the pipeline operator has an interest in knowing the exact location of the pig. In the case of a stationary pig, the AGM 1 can function as a pig locating device. Tracking personnel carry the AGM 1 above and along the pipeline while monitoring the electromagnetic detection signals and/or magnetic sensors. Tracking personnel may use some type of pipeline locating device to facilitate following the route of the pipeline. Upon traveling directly, or nearly directly, over the pig, the AGM 1 will lock onto the pig's transmitted signal, or respond to the magnetic field of the pig, allowing the tracking crew to pinpoint the pig's underground location. Typically, the tracking crew would use stakes to mark the location of the pig until the pigging operation can be resumed. When the pipeline operator is ready to redirect the flow back into the pipeline being inspected, the tracking crew can confirm the pig is still within the marked area and that the transmitter 42 is still working. The tracking crew can then place the AGM 1 ahead of the pig to confirm it has started moving as the normal pipeline flow is resumed. Upon resumption of normal operations, the tracking team may start or continue tracking the moving pig by placing the AGMs at the pre-surveyed AGRs (checkpoints).

In the case of a stuck pig, excavation may be required to remove the pig. It is evident that knowing the precise location of the pig minimizes recovery costs.

CONCLUSION

The AGM/remote telemetry unit (RTU) thus serves at least several purposes: (i) the AGM enables field personnel to track an inline inspection (ILI) tool or pig as it travels through a pipeline, (ii) the AGM enables technicians to correct inspection data to account for timekeeping and odometer drift while the tool is in the pipe, (iii) the AGM is useful for locating a stationary pig in a pipeline; (iv) the AGM enables all essential parties to monitor the pigging operation from any location in the world by using: an AGM, a communications hub, or any computer with Internet access; (v) the AGM provides a multi-physics approach for automatic pig detection for enhanced detection and accuracy of pig passage; (vi) the AGM provides multiple means for the tracking team to physically monitor an AGM during a pigging operation; (vii) the AGM provides improved logistical efficiency during pigging operations; (viii) the AGM allows the tracking team to communicate regardless of geographic position; and (ix) the AGM allows pipeline operators to permanently deploy AGMs and monitor them remotely.

Therefore, the present invention provides a tracking system for tracking an in-line inspection tool or pig as the pig travels along and through a pipeline. The tracking system provides enhanced detection capabilities. Also, the tracking system provides enhanced communication of the approach and arrival and passage of the tool or pig at particular passage points along the pipeline via satellite communications. The tracking system communicates the pig data to tracking vehicles in the field so multiple vehicles or team members are notified of the pig passage to track and monitor the pig as it travels along and through the pipeline. Also, the tracking system provides the ability to precisely locate a stationary pig in the pipeline.

Changes and modifications to the specifically described embodiments may be carried out without departing from the principles of the present invention, which is intended to be limited only by the scope of the appended claims as interpreted according to the principles of patent law including the doctrine of equivalents.

LIST OF COMPONENTS

1 Above Ground Marker (AGM)
2 Pipeline
4 Above Ground Reference (AGR)
5 Acoustic detection zone
6 Magnetic detection zone
7 Low frequency (LF) detection zone
8 Underground feature
9 Communications hub
10 PDA/Display device/Handheld computer
11 Satellite gateway
12 Server
13 Satellite constellation/network
14 Tracking Vehicle
15 FM radio
16 Microprocessor
17 Geophone
18 Anisotropic magneto-resistive sensors
19 Magneto-inductive sensors
20 Accelerometers
21 LF detection circuit
23 LF directional antenna
24 Communication module
25 Satellite antenna
26 GPS antenna
27 Satellite module/modem
28 GPS module
29 Voltage Pre-regulator
30 12V power input
31 Voltage regulator/voltage control
32 Data storage
33 Secure Digital (SD) card—Memory
34 Backup Battery
35 Central Monitoring Station (CMS)
36 Central processing and communications module (CPCM)
37 Sensor modules
38 Ethernet
39 Hall Effect sensors
40 Pig
41 LF signal
42 LF Transmitter
43 Odometer wheel
44 Sealing cup
100 Pig tracking system
101 AGM System
101' Permanent AGM Installation

The invention claimed is:

1. An inline tool tracking system for tracking an inline tool traveling along and through a pipe or conduit, said tracking system comprising:

a detection and communication device operable to detect an inline tool as the inline tool passes generally at or near said detection and communication device, wherein said detection and communication device, responsive to detection of an inline tool, generates a detection output, said detection output including data indicative of the detection of the inline tool and a geographical location of the detection and communication device;

a control remote from said detection and communication device, said control operable to wirelessly receive said detection output of said detection and communication device, wherein said control, responsive to receipt of said detection output, processes said detection output, and wherein said control generates a control output responsive to said processing of said detection output, said control output being indicative of the detection of the inline tool and the geographical location of the detection and communication device;

a tracking vehicle movably disposed at a geographical region associated with the pipe or conduit and drivable by a driver of said tracking vehicle;

a display device associated with said tracking vehicle, wherein said display device is operable to receive an input indicative of said control output and to display information indicative of the detection of the inline tool and the geographical location of the detection and communication device, wherein said display device is operable, responsive at least in part to receipt of said input, to display said information for viewing by a user of said display device while the inline tool is traveling along and through the pipe or conduit; and wherein the driver of said tracking vehicle drives said tracking vehicle towards said detection and communication device at least in part responsive to said display device displaying the information indicative of the detection of the inline tool and the geographical location of the detection and communication device.

2. The tracking system of claim 1, wherein said control is associated with a tracking communication device at or near said tracking vehicle, said control operable to wirelessly receive said detection output from said detection and communication device and to wirelessly communicate said control output to said display device.

3. The tracking system of claim 1, wherein said control is incorporated into said display device.

4. The tracking system of claim 1 further comprising a tracking communication device associated with said tracking vehicle, wherein said tracking communication device is operable to receive said control output from said control and to communicate said input to said display device.

5. The tracking system of claim 4, wherein said detection and communication device communicates said detection output to a satellite network, said control receiving said detection output of said detection and communication device via the satellite network.

6. The tracking system of claim 5, wherein said control is remote from said tracking communication device, and wherein said tracking communication device is operable to receive said control output from said control via the satellite network.

7. The tracking system of claim 5, wherein said control is at or near or associated with said tracking communication device.

8. The tracking system of claim 5, wherein said detection and communication device is operable to generate a short range communication signal to a nearby one of a plurality of tracking communication devices, said short range communication signal including data indicative of the detection of the inline tool and a geographical location of said detection and communication device.

9. The tracking system of claim 5, wherein said detection output and said control output include audio data indicative of recorded audio signals during passage of the inline tool.

10. The tracking system of claim 9 further comprising an audio output device associated with said tracking vehicle, said tracking communication device communicating said audio data to said audio output device of said tracking vehicle.

11. The tracking system of claim 5, wherein said control is operable to display information indicative of the detection of the inline tool at a display at a central monitoring station.

12. The tracking system of claim 11, wherein said display at said central monitoring station includes a map of the pipeline and includes the location of the detected inline tool as the inline tool travels along and through the pipe or conduit and a location of at least some of a plurality of tracking vehicles.

13. The tracking system of claim 5, comprising at least two tracking vehicles and at least two tracking communication devices, wherein each said tracking communication device is associated with a respective tracking vehicle, said tracking communication devices being operable to receive said control output from said control, said tracking communication devices communicating information indicative of said control output to said display device to display the information to a user of the respective tracking vehicle.

14. The tracking system of claim 5, wherein said detection and communication device comprises a plurality of detection devices and a communication unit, each of said detection devices being associated with a particular pipeline at or near said communication unit, said communication unit receiving signals from said detection devices, said communication unit generating said detection output to the satellite network responsive to receipt of said signals from said detection devices.

15. The tracking system of claim 1, wherein said detection and communication device detects the inline tool via at least one of an acoustic detection device, a magnetic detection device and an electromagnetic frequency detection device.

16. The tracking system of claim 1, wherein said detection and communication device detects the inline tool via an acoustic detection device, a magnetic detection device and an electromagnetic frequency detection device.

17. The tracking system of claim 2, wherein said control receives geographical location data of said tracking communication device from said tracking communication device, said control output including data indicative of the geographical location of said tracking communication device.

18. The tracking system of claim 1, wherein said detection output is generated as a short burst packet of data.

19. The tracking system of claim 1, wherein said control output is generated as a short burst packet of data.

20. The tracking system of claim 1, wherein said detection output and said control output include audio data indicative of recorded audio signals during passage of the inline tool.

21. The tracking system of claim 1, wherein said detection and communication device comprises a plurality of detection devices and a communication unit, each of said detection devices being associated with a particular pipeline at or near said communication unit, said communication unit receiving signals from said detection devices, said communication unit generating said detection output responsive to receipt of said signals from said detection devices.

22. The tracking system of claim 1, wherein the inline tool comprises at least one of (i) an inline inspection tool that detects abnormalities along the pipe, (ii) a gauging tool, (iii) a mapping tool, (iv) a cleaning tool, (v) a scraping tool, (vi) a measuring tool for measuring pipe geometry, such as inside diameter, bends, dents, restrictions or wrinkles, and (vii) a batching tool.

23. A method of tracking an inline tool that is traveling along and through a pipe or conduit, said method comprising:
   detecting an inline tool as the inline tool passes generally at or near a detection and communication device;
   generating a detection output via said detection and communication device, said detection output including data indicative of the detection of the inline tool and a geographical location of said detection and communication device;
   providing a control;
   said control receiving said detection output of said detection and communication device and processing said detection output;
   said control generating a control output responsive to said processing, said control output being indicative of the detection of the inline tool and the geographical location of said detection and communication device;
   providing at least one tracking vehicle movably disposed at a geographical region associated with the pipe or conduit and at least one display device associated with said at least one tracking vehicle, said display device receiving an input indicative of said control output and, responsive at least in part to receipt of said input, displaying information indicative of the detection of the inline tool and the geographical location of said detection and communication device for viewing by a user of said at least one tracking vehicle while the inline tool is traveling along and through the pipe or conduit; and driving said tracking vehicle towards said detection and communication device at least in part responsive to said display device displaying the information indicative of the detection of the inline tool and the geographical location of said detection and communication device.

24. The method of claim 23 further comprising providing at least one tracking communication device associated with said at least one tracking vehicle, wherein said control is associated with said at least one tracking communication device, said control operable to wirelessly receive said detection output from said detection and communication device and to wirelessly communicate said control output to said display device associated with said at least one tracking vehicle.

25. The method of claim 23, wherein said control is incorporated into said display device.

26. The method of claim 23 further comprising providing at least one tracking communication device associated with said at least one tracking vehicle, said tracking communication device receiving said control output from said control, said tracking communication device communicating information indicative of said control output to said display device to display the information to a user of said at least one tracking vehicle.

27. The method of claim 26, wherein generating a detection output comprises communicating a detection output to a satellite network via said detection and communication device, and wherein said control receives said detection output of said detection and communication device via the satellite network.

28. The method of claim 27, wherein said control is remote from said at least one tracking communication device, said tracking communication device receiving said control output from said control via the satellite network.

29. The method of claim 28, wherein said control receives geographical location data of said at least one tracking communication device from said tracking communication device, said control output including data indicative of the geographical location of said tracking communication device.

30. The method of claim 29, wherein said at least one tracking communication device and said at least one tracking vehicle comprise a plurality of tracking communication devices and a plurality of tracking vehicles, and wherein said control receives geographical location data from each of said tracking communication devices and wherein said control output includes data indicative of the geographical location data of each of said tracking communication devices, and wherein said method comprises determining a closer one of said tracking vehicles that is closer to the geographical location of said detection and communication device and moving the closer tracking vehicle towards the geographical location of said detection and communication device.

31. The method of claim 27 further comprising generating a short range communication signal via said detection and communication device, said short range communication signal being communicated to a nearby one of said at least one tracking communication device, said short range communication signal including data indicative of the detection of the inline tool and the geographical location of the detection and communication device.

32. The method of claim 27, wherein generating a detection output comprises generating a detection output that includes audio data indicative of recorded audio signals during passage of the inline tool.

33. The method of claim 32, wherein generating a control output comprises generating a control output that includes audio data indicative of recorded audio signals during passage of the inline tool.

34. The method of claim 33 further comprising an audio output device associated with said at least one tracking vehicle, said tracking communication device communicating said audio data to said audio output device of said at least one tracking vehicle.

35. The method of claim 27 further comprising displaying information indicative of the detection of the inline tool at a display at a central monitoring station.

36. The method of claim 27, wherein said at least one tracking communication device comprises at least two tracking communication devices associated with respective tracking vehicles, said tracking communication devices receiving said control output from said control, said tracking communication devices communicating information indicative of said control output to a respective display device to display the information to a user of the respective tracking vehicle.

37. The method of claim 27, wherein said detection and communication device comprises a plurality of detection devices and a communication unit, each of said detection devices being associated with a particular pipeline at or near said communication unit, said communication unit receiving signals from said detection devices, said communication unit generating said detection output to the satellite network responsive to receipt of said signals from said detection devices.

38. The method of claim 23, wherein detecting an inline tool comprises detecting an inline tool via at least one of an acoustic detection device, a magnetic detection device and an electromagnetic frequency detection device.

39. The method of claim 23, wherein detecting an inline tool comprises detecting an inline tool via an acoustic detection device, a magnetic detection device and an electromagnetic frequency detection device.

40. The method of claim 23, wherein generating a detection output comprises generating a detection output that includes audio data indicative of recorded audio signals during passage of the inline tool.

41. The method of claim 23, wherein said detection and communication device comprises a plurality of detection devices and a communication unit, each of said detection devices being associated with a particular pipeline at or near said communication unit, said communication unit receiving signals from said detection devices, said communication unit generating said detection output responsive to receipt of said signals from said detection devices.

42. The method of claim 23, wherein the inline tool comprises at least one of (i) an inline inspection tool that detects abnormalities along the pipe, (ii) a gauging tool, (iii) a mapping tool, (iv) a cleaning tool, (v) a scraping tool, (vi) a measuring tool for measuring pipe geometry, such as inside diameter, bends, dents, restrictions or wrinkles, and (vii) a batching tool.

43. An inline tool tracking system for tracking an inline tool traveling along and through a pipe or conduit, said tracking system comprising:

a plurality of detection and communication devices disposed along a pipe or conduit and operable to detect an inline tool as the inline tool passes generally at or near a respective one of said detection and communication devices, wherein each of said detection and communication devices, responsive to detection of an inline tool at or near the respective detection and communication device, generates a respective detection output, said respective detection output including data indicative of the detection of the inline tool and a geographical location of the respective detection and communication device;

a plurality of controls and a plurality of display devices associated with respective ones of a plurality of tracking vehicles movably disposed at a geographical region associated with the pipe or conduit, wherein said controls wirelessly receive said detection outputs of said detection and communication devices and process said detection outputs, and wherein each of said controls generates a respective control output responsive to said processing, said respective control output being indicative of the detection of the inline tool and the geographical location of the respective detection and communication device that detected the inline tool and generated said respective detection output;

wherein each of said display devices receives an input indicative of a control output of a respective one of said controls, and wherein said display device is operable, responsive at least in part to receipt of said input, to display information indicative of the detection of the inline tool and the geographical location of the detection and communication device that generated said respective detection output for viewing by a user of the respective display device while the inline tool is traveling along and through the pipe or conduit; and wherein the driver of a respective tracking vehicle drives said tracking vehicle towards a detection and communication device at least in part responsive to said display device of the respective tracking vehicle displaying the information indicative of the detection of the inline tool and the geographical location of the detection and communication device that generated the respective detection output.

44. The inline tool tracking system of claim 43, wherein a determination is made as to which of said tracking vehicles is nearer to the geographical location of the detection and communication device that generated said respective detection output.

* * * * *